July 31, 1956 E. W. LOWE ET AL 2,757,024
MACHINE-INSERTED SERVICE TEE
Filed June 26, 1953

INVENTORS
*Earl W. Lowe*
*Cecil R. Foltz*

BY *Cushman, Darby & Cushman*
ATTORNEYS

United States Patent Office 2,757,024
Patented July 31, 1956

2,757,024

MACHINE-INSERTED SERVICE T

Earl W. Lowe, Decatur, Ill., and Cecil R. Foltz, Los Angeles, Calif., assignors to Mueller Co., Decatur, Ill., a corporation of Illinois Application June 26, 1953, Serial No. 364,371

1 Claim. (Cl. 285—156)

This invention relates to a service T adapted to be screwed to a tapped aperture in a main for connecting a branch or service pipe to the latter without loss of pressure, i. e., escape of fluid from the main to the atmosphere during the connecting operation. More especially, this invention pertains to an improved service T of the type disclosed in the copending application of John J. Smith, Serial No. 283,881, filed April 23, 1952.

The service T disclosed in the aforementioned copending application has a through bore and a lateral outlet. One end of the T, i. e., the inlet end, is provided with exterior threads for engagement in a tapped aperture in a main, while the other end of the T is provided with exterior threads for the connection thereto of an enclosed drilling and plugging machine having a pressure chamber through which tools may be manipulated. The machine-connectable end of the T also is interiorly threaded for the reception of a closure plug. For reasons later described, the bore of the T is blocked by an integral web located at a position between the inlet end of the T and its lateral outlet.

In connecting a T of this type to a main, the main first is drilled and tapped without loss of pressure by an enclosed machine, as is well known in the art. By use of the same drilling and tapping machine, the service T is then inserted and screwed into the tapped aperture in the main without loss of pressure. Thereafter the drilling and T-inserting machine is removed from the main, whereupon the service pipe may be connected to the T and completely installed and tested without escape of fluid from the main because of the blocking web in the T. After the service pipe has been installed, an enclosed drilling and plugging machine of known construction is connected to the T and the bore-blocking web is drilled out to allow fluid to flow from the main through the T and into the service pipe. The drilling and plugging machine is then utilized to plug and cap the T in a conventional manner, again without loss of pressure.

T's of the type under consideration also are provided with a bore section of uniform diameter located inwardly of the plug-engaging interior threads, such bore section being adapted to receive an expansible pipe stopper to shut off flow from the main to the service pipe, after the web has been drilled out, in order to enable repairs to be made to the service pipe, or for other reasons.

A service T of the type under consideration usually is made by a casting operation, after which its bore and lateral outlet are formed by drilling operations. Subsequent to the drilling operations, the interior and exterior T threads are formed by an appropriate threading machine. The inner surface of the integral web blocking the through bore of the T is provided with a conical depression which serves to center a drill when the web is being drilled out as aforedescribed. The depression is formed by the conical end of a metal drill in the bore-forming operation. The outer surface of the web, which ordinarily is flush with the inlet end of the T, is flat.

The result of the aforementioned type of T construction is to leave an integral bore-blocking web which has a drill-centering conical depression in its interior surface and while its exterior surface is flat or plane and disposed transversely of the bore of the T. Since the outer or exterior surface of the web is flat, during the subsequent web-drilling operation the drill must cut away a considerable amount of metal. The necessity of cutting away a relatively large quantity of metal in order to completely penetrate through the web increases the time consumed for the drilling operation. It can readily be seen that when a large number of service T's have to be installed by a public utility, the summation of excessive drilling times greatly adds to the labor costs involved.

Accordingly, it is an object of this invention to provide a service T of the type under consideration with a bore-blocking web configuration which greatly shortens the time necessary to drill therethrough after the T has been installed in a main.

It is another object of this invention to provide a service T of the type under consideration with a blocking web which is sufficiently strong to withstand main pressures, yet which requires less metal-cutting for a drill in the drilling-out operation than service T's heretofore known.

Other objects and advantages of the invention will be apparent from the following description and accompanying drawings, in which.

Figure 1:
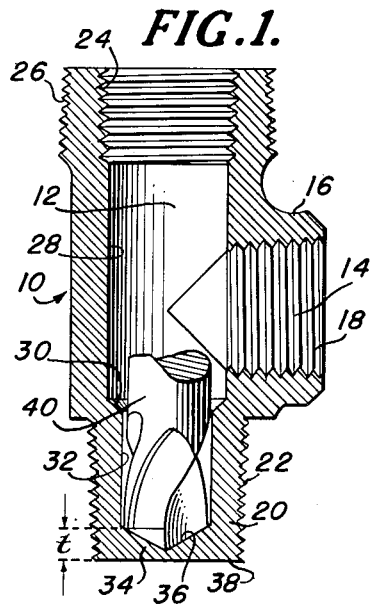
Figure 1 is a longitudinal sectional view of a service T of the type on which this invention is an improvement.

Referring now to Figure 1 of the drawings, the service T 10 illustrated therein comprises a tubular member having an axial bore 12 and a lateral or side outlet 14 that is surrounded by an exterior boss 16 and which may have interior threads 18 for the connection of a service pipe (not shown) thereto. The inlet end 20 of the T is provided with exterior threads 22, preferably iron pipe threads, for connecting the T 10 into a previously tapped opening in a main (not shown). The other end of the T 10 is provided with interior threads 24 for the reception of a threaded plug (not shown) and exterior threads 26 for the connection of a drilling and plugging machine (not shown). The bore 12 of the T 10 consists of a cylindrical section 28 of substantially the same diameter as the minimum diameter of the interior threads 24 and extending therefrom just past the lateral outlet 14, at which point the bore is restricted to provide an interior shoulder 30 and then extends as a section 32 of reduced diameter to the inlet end 20 of the T.

At the inlet end 20 of the T 10, the reduced bore section 32 is blocked by an integral web 34 having its entire interior face formed with a conical depression 36. The conical depression 36 is formed by the conical end of the metal drill (not shown) which formed the reduced bore section 32. The depression 36 serves a purpose later described. The end surface 38 of the inlet end 20 of the T, which also constitutes the exterior surface of the web 34, is flat and extends transversely of the axis of the bore 12.

When the T 10 has been installed in a main (not shown), as heretofore described, and as set forth in considerable detail in the aforementioned copending application to John J. Smith, the web 34 is drilled out by a metal drill 40 to allow flow to take place from the main through the T 10 and into a service pipe connected to the lateral outlet 14 of the T. It will be seen, however, that the drill 40, in order to pass completely through the web 34, must cut away a thickness of metal equal to the thickness of the web at the peripheral outline of the drill 40, such thickness being generally indicated at $t$. Obviously, this metal must be cut away in order for the drill 40 to pass completely through the web 34, even though the drill first penetrates the web at the center thereof. Therefore, the entire end of the drill is under a cutting load until it breaks through the center of the web. Thereafter the cutting load progressively decreases until complete penetration is achieved. The high initial cutting load, however, increases the overall drilling time.

Figure 2:
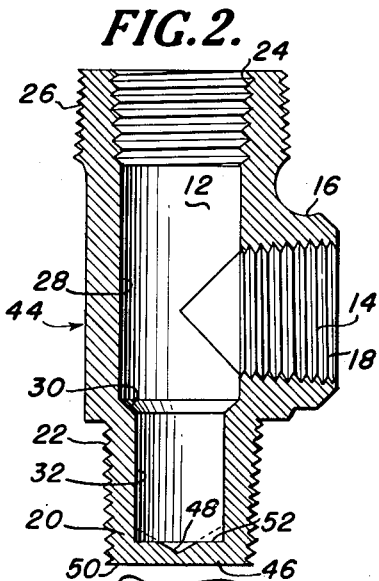
Figure 2 is a longitudinal sectional view of a service T embodying this invention.

Referring now to Figure 2 of the drawings, the service T 44 embodying this invention and illustrated therein is substantialy identical to the service T 10 shown in Figure 1, except for the configuration and construction of the bore-blocking web 46. Hence, the parts of the T 44 which are the same as the corresponding parts of the T 10 are identified by the same reference characters. The interior surface of the bore-blocking web 46 is provided with a central drill-centering conical depression 48 having a major diameter less than the diameter of the web. The exterior surface of the web 46, i. e., the end face 50 of the inlet end 20 of the T, is substantially flat, and the annular portion of the web which extends between the periphery of the conical depression 48 and the outer periphery of the web is of substantially uniform thickness. It will be seen that this construction may be obtained by properly machining a T of the type illustrated in Figure 1 to remove a quantity of metal from the inner side of the web, as indicated by the dotted lines in Figure 2.

Figure 3:
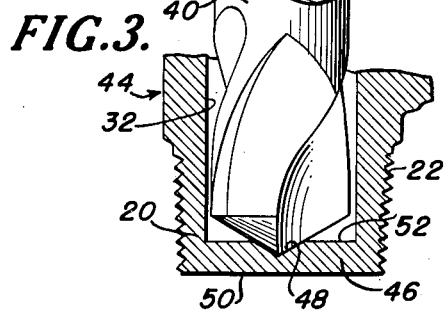
Figure 3 is an enlarged fragmentary longitudinal sectional view of a portion of the service T illustrated in Figure 2, and showing a drill in position therein at the start of the drilling operation.

Referring now to Figure 3 of the drawings, it will be seen that the central conical depression 48 in the interior surface of the web 46 is complementary to the conical end of a metal drill 40 which is to be used to drill out the web in the manner aforedescribed. Hence, this conical depression 48 serves to center the drill 40 for the drilling operation. It will be seen that the drill 40 must travel substantially the same distance to achieve complete penetration of the web 34 of the T 10 shown in Figure 1 or the web 46 of the T 44 in Figure 2. It is pointed out, however, that in cutting away the web 46, the entire end face of the drill 40 is not in complete engagement with the work, and therefore is not under a cutting load. As the drill 40 penetrates into the web 46, the cutting load increases somewhat until the drill first penetrates the web 46 at the center thereof. Thereafter, the cutting load progressively decreases until complete penetration is effected. It will be seen that because the drill 40 has to cut away less metal in order to pass completely through the web 46, and the cutting load is correspondingly reduced, the time required for the drilling operation on the T shown in Figure 2 is less than that required on the T shown in Figure 1, i. e., a prior art T.

Figure 4:
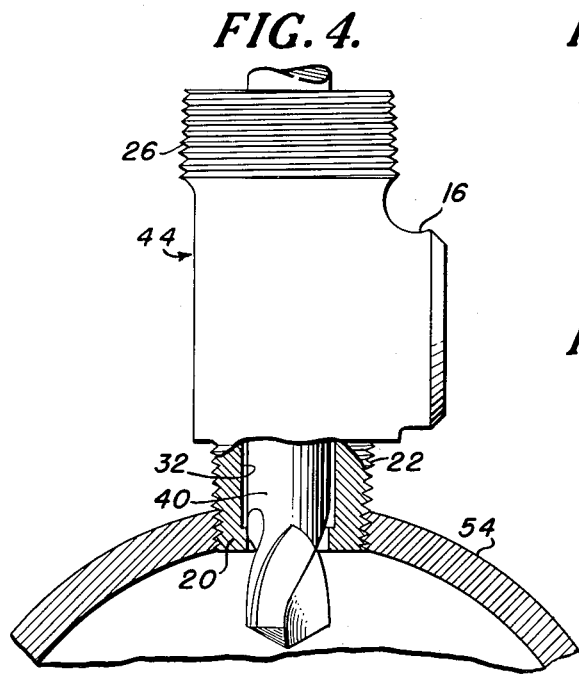
Figure 4 is an elevational view, partly in vertical section, illustrating a service T embodying this invention installed in a main and with a drill in the position assumed subsequent to complete penetration through the bore-blocking web.

It also will be noted that the minimum thickness of the web 46, i. e. at the center of the conical depression 48 therein, is the same as the minimum thickness of the web 34 of the T 10 shown in Figure 1. Hence, the web 46 is substantially as strong as the web of prior art T and has ample strength to resist the pressure in a main 54 when installed therein, as shown in Figure 4. It is pointed out further that the web 46 can be located inwardly of the extreme inlet end of the T 44.

Figure 5:
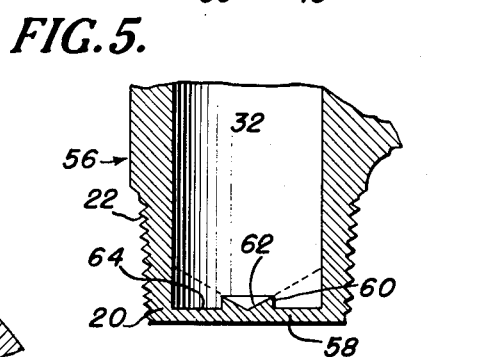
Figure 5 is a view corresponding to Figure 3 but illustrating a modified form of this invention.

Referring now to Figure 5 of the drawings, there is shown therein a modified form of T 56 embodying this invention. This modification illustrates a carrying-forward of the invention shown in Figures 2 to 4, in that the web 34 of a T such as that shown in Figure 1 is machined away on its interior face to a greater extent than in the T 44 shown in Figures 2 to 4. In this modification, a cutting tool has been used to machine away an annular section of metal from the interior surface of the web 58, as indicated by the dotted lines in Figure 5, to leave a circular boss 60 on the interior surface of the web. The boss 60 has a central drill-guiding conical depression 62 therein. It will be noted that the height of the boss 60 does not exceed the depth of the conical depression 62 therein, so that the thickness of the annular portion 64 of the web 58 extending between the outer periphery thereof and the periphery of the boss is not less than the thickness of the web at the center of the conical depression. Accordingly, the minimum thickness of the web 58 is not less than the minimum thickness of the web 34 of the T 10 illustrated in Figure 1. Hence, the web 58, again, is substantially as strong as the web of prior art T's. It is pointed out, however, that since additional metal has been removed from the web of the T 56, the time required to drill completely therethrough is even less than the time required to drill through the web 46 of the T 44 illustrated in Figures 2 to 4.

It will thus be seen that the objects of this invention have been fully and effectively accomplished. It will be realized, however, that changes may be made in the specific embodiments shown and described to illustrate the principles of this invention without departing from such principles. Accordingly, this invention includes all modifications encompassed within the spirit and scope of the following claim.

We claim:

A service T having a through bore and a lateral outlet, one end of said T being exteriorly threaded for engagement in a tapped opening in a main and the other end of said T being interiorly threaded for reception of a threaded plug and provided with exterior means for the attachment of means defining a pressure chamber through which tools may be manipulated, and an integral drillable web blocking said through bore at a location between said lateral outlet and said one end of the T, the exterior surface of said web being flat, and said web having a central interior circular boss thereon provided with a central drill-centering smooth-walled conical depression, the major diameter of said depression being equal to that of said boss, and the annular portion of said web between the peripheries of the latter and said boss being of a uniform thickness substantially equal to the web thickness in the center of said depression.

References Cited in the file of this patent

UNITED STATES PATENTS

| | | |
|---|---|---|
| 460,773 | Eleny | Oct. 6, 1891 |
| 1,701,691 | Mueller et al. | Feb. 12, 1929 |
| 1,960,272 | Lovekin | May 29, 1934 |
| 1,996,345 | Mueller | Apr. 2, 1935 |
| 2,255,361 | Mueller | Sept. 9, 1941 |

FOREIGN PATENTS

| | | |
|---|---|---|
| 408,877 | France | Year of 1910 |